UNITED STATES PATENT OFFICE.

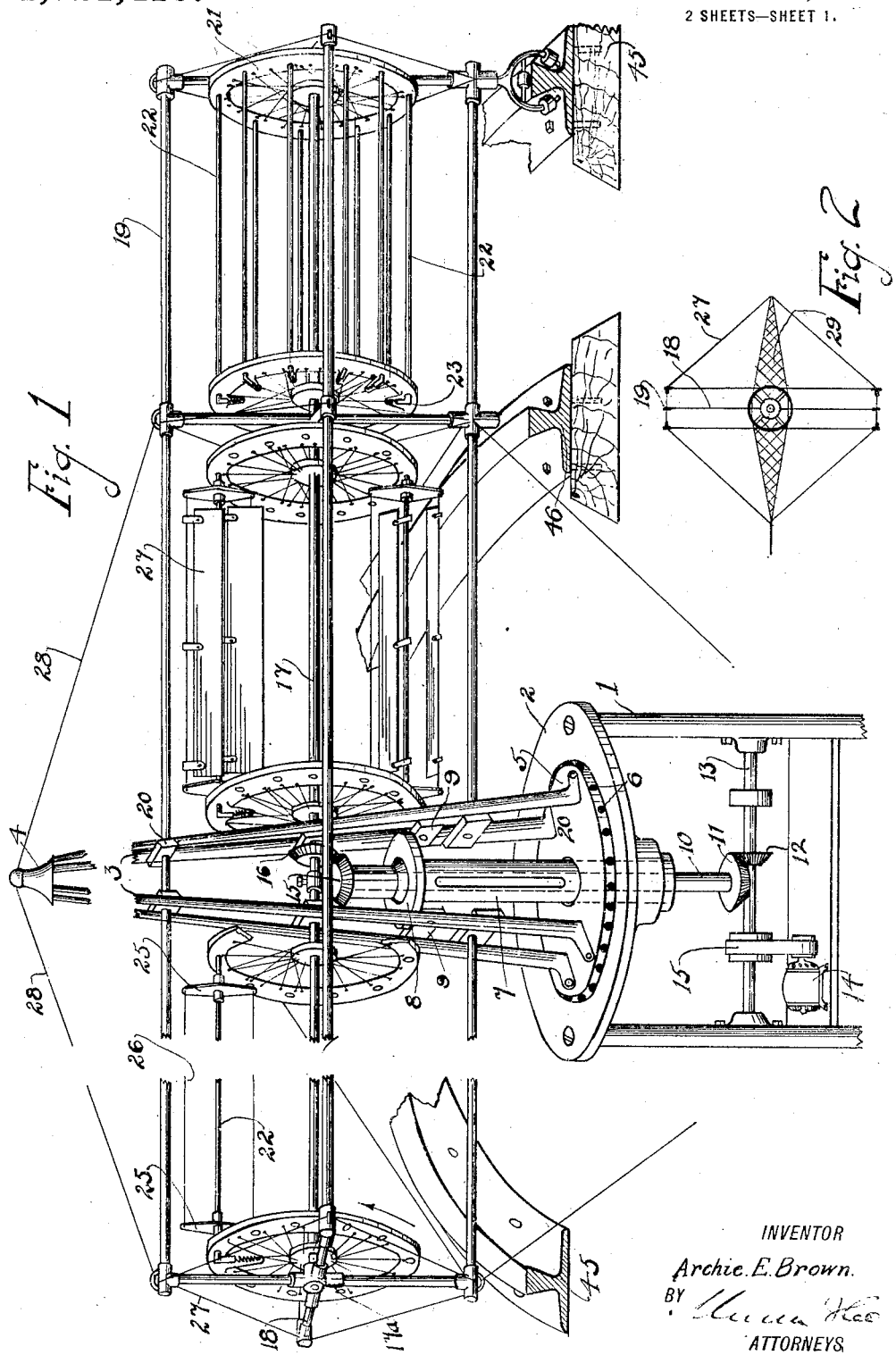
A. E. BROWN.
WINDMILL.
APPLICATION FILED FEB. 20, 1919.
1,321,415.
Patented Nov. 11, 1919.
2 SHEETS—SHEET 1.
INVENTOR
Archie E. Brown.
BY
ATTORNEYS

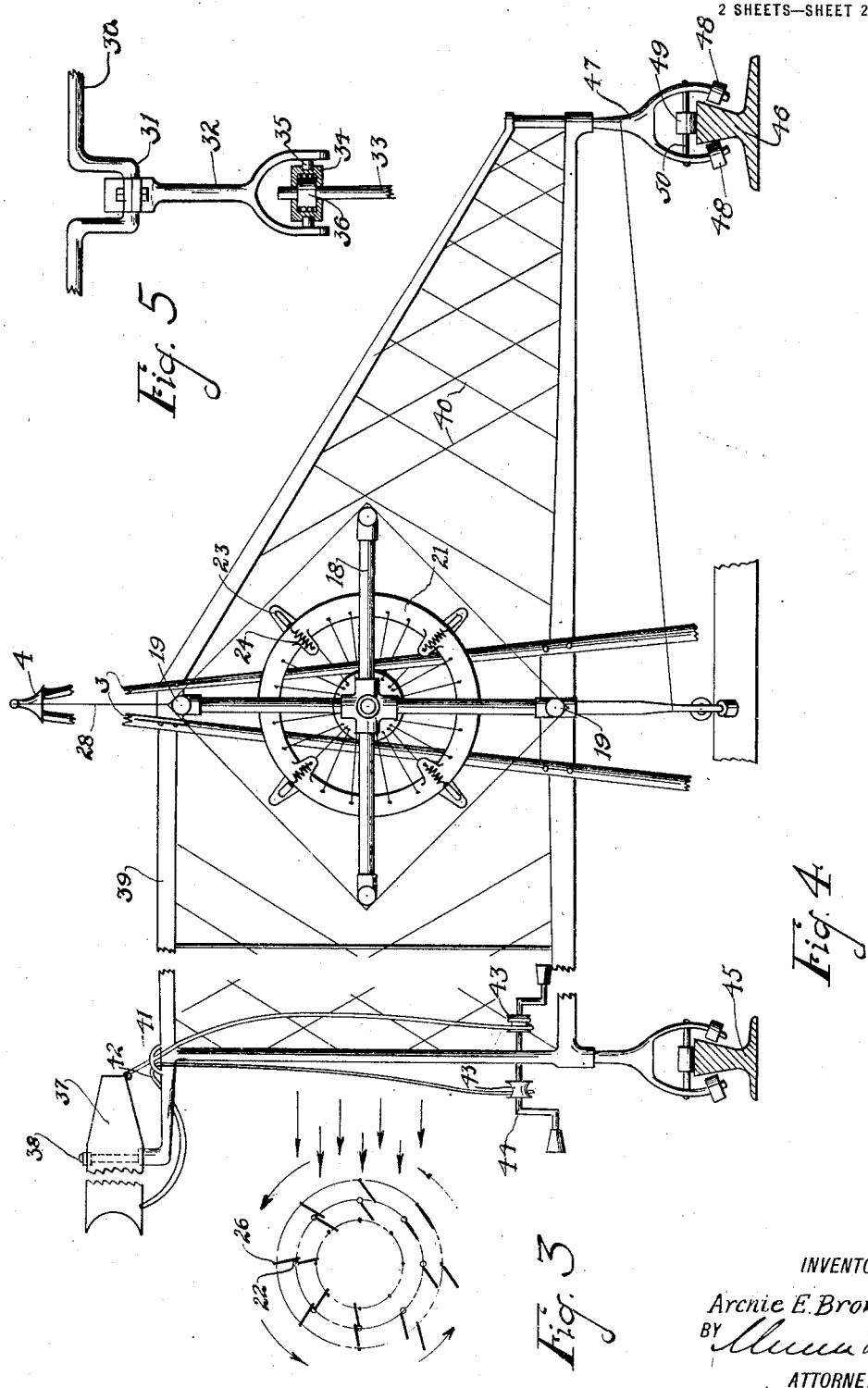

ARCHIE EDWARDS BROWN, OF EL PASO, TEXAS, ASSIGNOR OF ONE-TENTH TO LEIGH CLARK, OF EL PASO, TEXAS.

WINDMILL.

1,321,415.   Specification of Letters Patent.   Patented Nov. 11, 1919.

Application filed February 20, 1919. Serial No. 278,162.

*To all whom it may concern:*

Be it known that I, ARCHIE EDWARDS BROWN, a citizen of the United States, and a resident of El Paso, in the county of El Paso and State of Texas, have invented certain new and useful Improvements in Windmills, of which the following is a specification.

My invention is an improvement in windmills, and has for its object to provide a windmill wherein the wheel operated by the wind current is arranged to rotate on a horizontal axis, and to rotate about a vertical axis on the tower or support for the wheel, and wherein the blades or vanes of the wheel are connected thereto to move into inoperative position at the bottom of the wheel and into operative position at the top, and wherein they are mounted to yield under an excess pressure to prevent injury to the mill.

In the drawings:

Figure 1 is a front view of the improved mill;

Fig. 2 is a diagrammatic plan view of the wheel construction;

Fig. 3 is a diagrammatic end view of the wheel construction showing the different positions of the blades;

Fig. 4 is an end view with the track in section;

Fig. 5 is a detail view, partly in section, showing a modified form of drive shaft adapted for connection with a reciprocating pump.

In the embodiment of the invention shown in Figs. 1 to 4, inclusive, the wind wheel to be described is supported upon a tower, consisting of uprights 1, which may be suitably braced together, connected at their tops by a circular plate 2, the said disk providing a base upon which the wheel may rotate. The supporting frame for the wheel consists of four uprights or standards 3 connected at their tops by a cap 4, and the bottoms of the uprights are connected to a disk 5, which is mounted to rotate upon the plate 2 coaxially therewith, ball bearings 6 being interposed between the disk 5 and the plate 2.

A sleeve or tubular casing 7 is firmly held at the center of the disk 5, the said sleeve passing through the disk, and through a collar 8 which is arranged above the disk 5. The sleeve is firmly secured in the disk and in the collar, and the collar is rigidly connected to the uprights 3 by means of cross bars 9. The shaft 10 is journaled at the axis of the sleeve 7, and this shaft at its lower end has a beveled gear 11 which meshes with a gear 12 on a horizontal shaft 13 journaled in the tower.

The shaft 13 may be connected to a generator 14 for electricity, for instance, to operate the same under conditions to be presently described, by means of a belt and pulley connection 15ᵃ. The upper end of the shaft 10 extends above the collar and has secured thereto the socket of a bevel gear 15. This gear meshes with a gear 16 on a shaft 17 which extends transversely of the shaft 10 above the same and is journaled in cross bars on the uprights 3. The shaft is also journaled in bearings 17ᵃ at the center of X-shaped members 18 which are arranged at suitable intervals throughout the length of the shaft 17.

The registering arms of these cross shaped members are connected by piping 19, the piping being also connected with cross bars 20 secured to the uprights 3. Thus a rigid frame is provided, extending transversely of the uprights 3, for supporting the shaft 17 which is at the center of the frame. A series of wheels 21 is secured to the shaft 17 at suitable intervals, each wheel consisting of a hub, a rim and wire spokes connecting the hub and the rim and arranged in somewhat the same manner as the spokes of a bicycle wheel, the said wheels being arranged in pairs, a pair between each adjacent pair of cross shaped members. The wheels of each pair are connected by rods 22, the ends of the rods being journaled in the rims of the wheel, and each rod has an angular arm 23 at each end on the outer face of the wheel. Coil springs 24 are arranged between the ends of the arms and inwardly extending lugs on the rim, and these springs act normally to hold the rods with the arms extending radially inward.

A pair of cross heads 25 is secured to each rod 22, the crossheads being similarly arranged, and at the ends of the rods, and the ends of the cross heads are connected by wires or rods 26. Blades 27 are supported by the rods 22, and the outermost rods 26, a blade being hinged to each outermost rod 26 and a second blade being hinged to each rod 22. The blades are of greater width than the distance between the rods 26 and the rod 22, so that the free edges of the outermost blades will engage the rod 22 and the edges of the innermost blades will engage the innermost rod 26 under conditions to be presently set forth. The ends of the arms of the cross shaped members are suitably braced by braces 27, and the frame 19 has suitable guy wires 28 to guy it to the cap 4.

In operation, when a current of air impinges against the blades of the wheel, those blades which are at the upper side of the wheel will stand vertical, and will be supported by the rods 22 and 26 so that they cannot swing rearwardly out of a vertical position, where their full plane is presented to the wind. The wheel will be rotated and as the blades move rearwardly they will successively occupy the positions shown in Fig. 3, having their planes almost horizontal at the rear of the wheel. A little lower down the free edges of the blades will be swung rearwardly, the rods 22 and 26 no longer offering any resistance to this swinging motion since they are in front of the blades and in inoperative position the blades will move forwardly and upwardly until they pass above the horizontal plane through the center of the wheel. Here they will again begin to receive the force of the wind and will assist in propelling the wheel. Thus all those blades which are moving with the wind current offer resistance thereto, while those that are moving toward the wind current offer no resistance to the same. The rotation of the shaft 17 is transmitted to the shaft 10 and to the shaft 13 which may drive any suitable mechanism for utilizing the power, as, for instance, the electric generator shown. It will be understood that the frame and all of the parts are suitably braced, the bracing being similar to that used in an aeroplane. As shown in Fig. 2, this bracing at the ends may be a lattice work arrangement as indicated at 29. In small mills the shaft 17 may be connected directly to a reciprocating pump, for instance, as shown in Fig. 5. In this instance the shaft 30 which corresponds to the shaft 17 has a crank 31 which is connected by a link 32 with the plunger rod 33 of the pump. The link 32 has a fork at its lower end, and a chambered collar 34 is supported between the arms of the fork, the said arms having inwardly extending pins 35 which engage similar openings in the collar.

A collar 36 is secured to the plunger rod within the chamber 34 and ball or roller bearings are arranged between the collars to permit the collars to turn freely with respect to each other. In order that the wheel may properly face the wind, a directing vane 37 is provided. This vane is pivoted on an upstanding journal pin 38 which forms part of a cross frame 39. This cross frame is arranged at the center of the wheel, that is, at the uprights 3, being connected with the upper and lower longitudinally extending piping members 19. The frame is suitably braced by guy wires 40 and the directing vane is swung into operative and inoperative positions by means of flexible members 41 and 42 which are connected with the vane on opposite sides of the journal pin 38. These flexible members pass to reels 43 which are mounted on a crank shaft 44 having suitable handles for turning the same, and journaled in the rear lower corner of the frame 39.

It will be obvious that by turning the shaft 44 in the proper direction the vane 37 may be swung into operative or inoperative position. When in operative position the wind wheel will be held at all times facing the direction of the wind. In large wheels, it is advisable to support the ends of the frame 18—19 and the ends of the cross frame 39. For this purpose suitable arc shaped tracks 45 and 46 are provided, the track 46 being inside the track 45. These tracks are of sufficient length to permit the required movement of the wheel, it being obvious that they might be complete circles if desired. Each track is composed of a rail and supporting ties for the rail, and each end of the frame 18—19 and each end of the frame 39, has means for engaging the adjacent trackway.

Each of the said means, shown more particularly in Fig. 4, is a fork 47 depending from the end of the frame, with the arms of the fork on opposite sides of the rails 45 or 46 as the case may be. Each arm has a roller 48 journaled thereon which engages the adjacent face of the rail and a third roller 49 is journaled on a cross pin 50 which connects the arms above the rail, the roller 50 running on the top of the rail. Referring to Fig. 4, it will be seen that the rails have wedge shaped heads and the rollers 48 are arranged to run upon the inclined faces of the heads. Thus upward movement of the frames is prevented.

I claim:—

1. In a wind wheel comprising spaced rings, shafts journaled in the rings, a blade suspended from each shaft, cross heads at the ends of the shafts, the corresponding ends of the cross heads being connected, a blade suspended on one of the connections and adapted to engage the shaft to limit the swinging of the blade in one direction, the other blade being adapted to engage the other connection to limit the swinging of the blade, said cross heads being rigid with the shaft and the shaft having radial arms at its ends and springs arranged between the arms and the rings and adapted to yield under a predetermined pressure.

2. In a wind wheel comprising spaced rings, shafts journaled in the rings, a blade suspended from each shaft, cross heads at the ends of the shafts, the corresponding ends of the cross heads being connected, a blade suspended on one of the connections and adapted to engage the shaft to limit the swinging of the blade in one direction, the other blade being adapted to engage the other connection to limit the swinging of the blade, said cross heads being rigid with the shaft, and yielding means for holding the shafts in a predetermined position.

3. A wind wheel comprising a support, a standard journaled on the support to rotate on a vertical axis, a wind wheel journaled on the standard to rotate on the horizontal axis, arc-shaped tracks coaxial with the standards, said tracks having under-cut side faces, and sets of wheels depending from the wind wheel and engaging the tracks, each set comprising three wheels, one engaging the top of the rail and the other two the under-cut side walls.

4. A wind wheel comprising sections, each section consisting of spaced rings, a series of blade supporting frames arranged between the rings and mounted to swing with respect thereto on axes parallel with the axis of the rings, and blades supported by the frames and mounted to swing with respect thereto, the frames having means for limiting the swinging of the blades in one direction, and yielding means normally holding the frames with their planes radial to the axis of the rings.

ARCHIE EDWARDS BROWN.

Witnesses:
P. H. BROWN,
T. C. McDERMOTT.

Copies of this patent may be obtained for five cents each, by addressing the "Commissioner of Patents, Washington, D. C."